No. 873,666.
PATENTED DEC. 10, 1907.
S. J. GRAY & J. HORNING.
SAW.
APPLICATION FILED SEPT. 5, 1906. RENEWED NOV. 5, 1907.
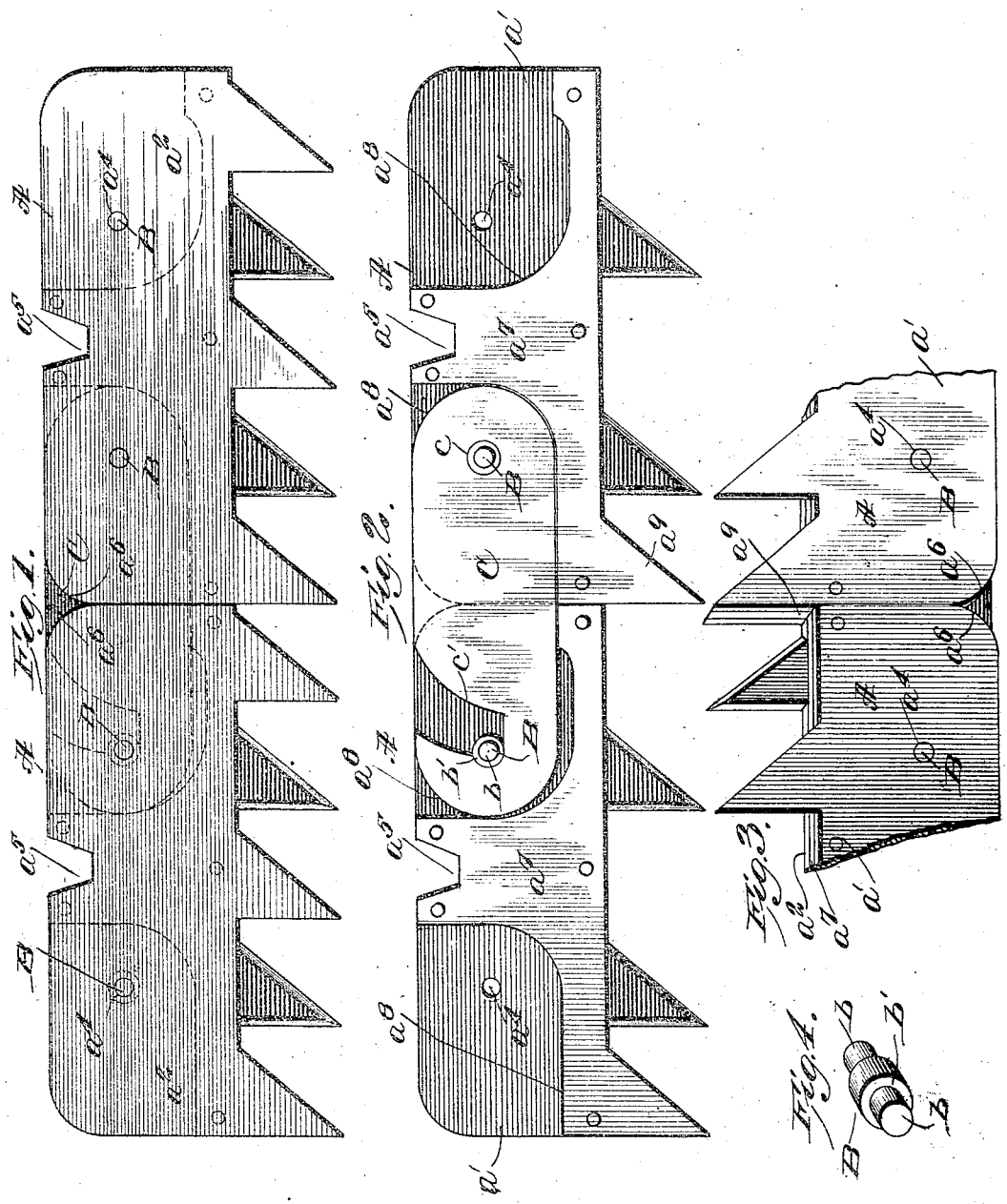
WITNESSES
INVENTORS
SIMON J. GRAY
JOHN HORNING
BY
ATTORNEYS

UNITED STATES PATENT OFFICE.

SIMON JOHNSTONE GRAY AND JOHN HORNING, OF OAKLAND, CALIFORNIA.

SAW.

No. 873,666.     Specification of Letters Patent.     Patented Dec. 10, 1907.

Application filed September 5, 1906, Serial No. 333,344. Renewed November 5, 1907. Serial No. 400,860.

*To all whom it may concern:*

Be it known that we, SIMON JOHNSTONE GRAY and JOHN HORNING, citizens of the United States, and residents of Oakland, in the county of Alameda and State of California, have made certain new and useful Improvements in Saws, of which the following is a specification.

Our invention is an improvement in saws and consists in certain novel constructions and combinations of parts hereinafter described and claimed.

Referring to the drawings, forming a part hereof—Figure 1 is a plan view of a portion of our improved saw. Fig. 2 is a similar view showing the upper plates removed. Fig. 3 is a perspective view of a portion of the cutting edge of the links. Fig. 4 is a perspective view of the rivet for connecting the plates.

Our improved saw consists of a series of alined links A, each link comprising a plurality of parallel plates $a'$, $a^2$, secured together and spaced apart from each other, by means of rivets B. The rivets B, are reduced at each end as at $b$, and are provided with shoulders $b'$, at the base of the reduced portion. The reduced ends $b$ of the rivets B, engage perforations $a^4$ in the plates $a'$, $a^2$, the inner faces of the plates resting against the shoulders $b'$, and the ends of the rivet are upset in the ordinary manner and are flush with the outer faces of the said plates.

A link or tie bar C is arranged between the plates of adjacent links, for connecting said links together, the tie bar being provided with a perforation $c$ for receiving the rivet of one link, and with a recess $c'$, for receiving the rivet of the adjacent link. The outer edge of the tie bar C, is flush with the outer edge of the plates $a'$, $a^2$, and the recess $c'$ opens at the outer edge of the tie bar as clearly shown in Figs. 1 and 2. The adjacent corners of the links at the rear or outer edge thereof, are rounded off as at $a^6$ for a purpose to be hereinafter described, and at approximately the center of the rear or outer edge of the said links, a notch $a^5$ is provided for engagement by the teeth of a toothed wheel, not shown, whereby to insure the proper driving of said saw.

It will be evident from the description, that since the tie bar is placed with its outer edge flush with the outer edge of the links and the adjacent corners of the links are rounded off, free movement of the links with respect to each other is permitted in the direction of the material operated upon, while such movement is prevented in the opposite direction.

By moving the adjacent ends of the links in the direction of length of the teeth, the tie bar may be unhooked from the rivet thus disengaging the links from each other.

For the purpose of strengthening the links, a filling plate $a^7$ is arranged between the parallel plates, the said plate being provided with a single tooth $a^9$ and being cut away as at $a^8$ to receive the tie bar and to permit movement thereof.

It will be noticed from an inspection of Figs. 1 and 2 that the teeth of the plates $a'$ are staggered with respect to the teeth of the plate $a^2$. At one end of each link, however, both of the plates $a'$ and $a^2$ have a tooth registering with the tooth $a^9$ of the filling plate, the whole forming a drag tooth for clearing the cut.

It will be evident from the description that the links of our improved saw may be easily connected and disconnected, and that the links are firmly supported against the work by the peculiar arrangement of the tie bar connecting said links.

The filling plates $a^7$ are preferably secured to one plate in any suitable manner, as by brazing or by rivets, the latter form being shown.

We claim—

1. A saw composed of a plurality of alined links, each link comprising parallel plates spaced apart from each other and provided upon one edge with teeth, a filling plate between the parallel plates provided with a single tooth, each of said parallel plates having a tooth registering with the tooth of the filling plate, whereby to form a drag tooth for the link, and a tie bar for connecting the adjacent links.

2. A saw composed of a plurality of alined links, each link comprising parallel plates spaced apart from each other and provided upon one edge with teeth, the teeth of the plates being staggered with respect to each other, a filling plate between the parallel plates provided with a single tooth, each of said parallel plates having a tooth registering with the tooth of the filling plate, whereby to form a drag tooth for the link, and a tie bar for connecting the adjacent links.

SIMON JOHNSTONE GRAY.
JOHN HORNING.

Witnesses:
ALBERT S. DAY,
E. R. BURNETT.